United States Patent [19]
Austin

[11] Patent Number: 6,039,332
[45] Date of Patent: Mar. 21, 2000

[54] STEERABLE HAND TRUCK

[76] Inventor: Jack L. Austin, 2740 Lee Rd., 179, Salem, Ala. 36974

[21] Appl. No.: 08/962,250

[22] Filed: Oct. 31, 1997

[51] Int. Cl.[7] ........................................................ B62B 1/12
[52] U.S. Cl. ..................................... 280/47.17; 280/47.11; 280/47.27
[58] Field of Search ............................ 280/87.01, 87.021, 280/87.043, 47.17, 47.18, 47.24, 47.27, 63, 64, 79.3, 771, 47.11

[56] References Cited

U.S. PATENT DOCUMENTS

| | | | |
|---|---|---|---|
| 2,235,041 | 3/1941 | Ronning | 280/47.27 |
| 2,235,042 | 3/1941 | Ronning | 280/47.11 |
| 2,235,043 | 3/1941 | Ronning | 280/47.11 |
| 2,235,044 | 3/1941 | Ronning | 280/47.27 |
| 2,711,330 | 6/1955 | Frye | 280/47.26 |
| 3,166,339 | 1/1965 | Earley | 280/47.26 |
| 3,507,511 | 4/1970 | Seidel | 280/87.01 |
| 4,203,609 | 5/1980 | Mitchelle t al. | 280/47.11 |
| 4,796,909 | 1/1989 | Kirkendall | 280/87.01 |

FOREIGN PATENT DOCUMENTS

| | | | |
|---|---|---|---|
| 340738 | 9/1921 | Germany | 280/47.11 |
| 3932946 | 4/1991 | Germany | 280/47.27 |
| 167348 | 2/1934 | Switzerland | 280/47.11 |

*Primary Examiner*—Daniel G. DePumpo
*Assistant Examiner*—Frank Vanaman
*Attorney, Agent, or Firm*—James W. Kayden; Thomas, Kayden, Hoorstemeyer & Risley, L.L.P.

[57] ABSTRACT

A steerable hand truck having improved maneuverability. In a first embodiment of the invention, the steerable hand truck includes a sheathed steering cable which connects at a first end to a pair of pivotal handles and at a second end to a pair of pivotal axle spindles. In a second embodiment, the steering mechanism of the hand truck comprises a series of pivotally connected rigid links. A first link in the series is pivotally connected to the handles and a last link in the series is connected to the axle spindles. Pivotal movement of the handles is transmitted to the axle spindles through the links. In a third embodiment, the steering mechanism comprises an electric motor which is actuated by a control switch mounted to the truck. The motor is used to drive the axle spindles either to the right or left depending upon the direction selected with the control switch. In each embodiment, the load platform of the truck is provided with a pivot point about which the truck can be pivoted when in the upright position to allow the operator to more easily turn the truck in limited spaces.

12 Claims, 7 Drawing Sheets

STEERABLE HAND TRUCK

FIELD OF THE INVENTION

The present invention relates to a hand truck. More particularly, the present invention relates to a steerable hand truck which can be used to easily maneuver loads in restricted spaces with little possibility of injury.

BACKGROUND OF THE INVENTION

Hand trucks of the general character described herein are frequently used by delivery persons, movers, and the like, to transport loads from place to place. Typically, such trucks comprise a rigid elongated frame, a pair of handles, and a pair of wheels whose axle is rigidly mounted to the base of the frame. Positioned adjacent the wheels is a load bearing platform upon which the goods or other objects to be moved are placed.

Although providing a simple means of transporting loads, conventional hand trucks of this type present several disadvantages. First, these hand trucks are difficult to use in small spaces. For instance, when a particular load can only be approached alongside a wall, removal of the load is complicated by the wall since it will typically prohibit turning of the truck. In such cases, the truck and the load being carried thereon must be slowly moved away from the wall along a path nearly parallel with the wall.

Even where there is adequate space with which to operate the truck, conventional trucks present an increased opportunity for on-the-job injury. When the truck is under load, especially under heavy loads, and the operator wishes to make a sharp turn with the truck, the operator must swing the handles to the side of his or her body. If the operator does not concurrently shift his or her body along with the handles, the operator is left supporting the weight of the load on one side of the body. This results in awkward twisting of the torso which places excessive strain on the muscles of the middle and lower back.

In addition to being difficult to use in cramped quarters and creating unnecessary strain on the operator, standard hand trucks are cumbersome and difficult to maneuver. Even when operated correctly in open spaces, wide sweeping turns are needed to manipulate the load and carry it to the intended destination.

Several attempts have been made to remedy the difficulties conventional hand trucks present. For example, U.S. Pat. No. 2,235,043, issued to Renning, discloses a steerable hand truck which can be turned with pivoting handles. Although seemingly adequate in operation, the steering mechanism of the hand truck extends towards the operator in a position likely to interfere with the operator's feet while walking behind the truck. In U.S. Pat. No. 2,800,336, Major et al., disclose a hand truck having a wheel direction shifting mechanism which permits the operator to change the alignment of the wheels. This mechanism cannot be changed during hauling, however, and requires the operator to bend over and shift the wheels manually with a lever when a change in alignment is desired.

From the above, it can be appreciated that there is a need for a steerable hand truck that is easily maneuverable by the operator so that hauling of loads is simplified to the greatest extent possible and the possibility of operator injury is minimized.

SUMMARY OF THE INVENTION

The present invention is directed to a steerable hand truck. The hand truck includes an elongated rigid frame which comprises a pair of opposed parallel side rails, a vertical cross brace, and a plurality of horizontal cross braces. The side rails are typically formed from hollow tubing or piping composed of a metal such as steel and the cross braces are typically formed from solid bars likewise composed of a metal such as steel.

Formed on the lower end of the rear side of the frame is an axle support to which the hand truck axle is mounted. Typically, this axle support takes the form of a single metal bar or tube, although other configurations may be used. Extending forwardly from the frame opposite the axle support is a load platform which typically takes the form of a metal plate. Extending downwardly from a bottom surface of the platform is a pivot about which the hand truck can be spun up through 360° when the truck is upright to turn the truck in limited spaces. Although possible of taking other forms, the pivot is usually a depression formed directly in the platform.

In a first embodiment of the invention, a pair of handles are pivotally mounted to the upper end of the frame. These handles are concentrically mounted within the side rails such that each can rotate about the central axis of the side rails. Each handle is maintained in a fixed vertical position with respect to the truck frame with a series of collars. The steering mechanism comprises a pair of handle levers that extend rearwardly from each handle and a steering tie rod which is pivotally connected to each handle lever. The handle tie rod maintains the handles in parallel relationship such that rotation or pivoting of one handle effects similar rotation or pivoting of the other. The steering mechanism further comprises a sheathed steering cable that includes an inner cable which is pivotally connected to one of the handle levers, and an outer sheath which is mounted to a mounting plate that is attached to the frame. Typically, the inner cable is composed of steel and the outer sheath has a rigid steel core that is surrounded by a polymeric cladding. Being connected to the handle lever, the inner cable can be pulled out from or pushed into the outer sheath through rotation of the handles.

The sheathed steering cable extends downwardly along the elongated rigid frame toward the lower portion of the steering mechanism. Each of the wheels is rotatably mounted to a wheel axle that extends outwardly from an axle spindle that is pivotally mounted in a spindle bracket. The spindle bracket functions to operatively connect each wheel axle to the frame. Extending forwardly from each axle spindle is a spindle lever. The spindle levers are connected with a wheel tie rod which pivotally attaches to both levers. Similar to the handle tie rod, the wheel tie rod maintains the wheels in parallel relationship such that pivoting of one wheel will effect similar movement of the other. Pivotally connected to one of the spindle levers is the second end of the inner cable of the sheathed steering cable.

Rigidly connected to each spindle bracket is a central axle that extends concentrically within an inner axle sleeve that is directly mounted to the axle support of the frame. Each of the spindle brackets is mounted to the central axle in an off-center manner so that the spindles are automatically maintained in an upright orientation regardless of the orientation of the truck frame to ensure proper steering control. The inner axle sleeve is positioned concentrically within an outer axle sleeve that is free to rotate thereabout. Extending forwardly from the outer axle sleeve is a mounting bracket to which the second end of the outer sheath is mounted.

In use, turning the handles causes the inner cable to either be pushed further into or pulled further out of the outer sheath depending upon the direction the handles are turned. Movement of the inner cable within the sheath causes similar movement of the axle spindle which thereby effects turning of the wheels.

In a second embodiment of the steerable hand truck, the steering cable of the first embodiment is replaced with a series of rigid links including a rigid handle link that is pivotally connected to the handle lever, a first angle link that is pivotally mounted to the truck frame and pivotally connected to the handle link, a transmission link that is also pivotally connected to the first angle link, a second angle link that is pivotally mounted to both the transmission link and the frame, and a wheel link that is pivotally connected at one end to the second angle link and pivotally connected to the wheel tie rod at its other end.

Similar to the truck of the first embodiment, the steerable hand truck of the second embodiment can be turned by manipulating the handles of the truck. The movement of the handle is transmitted from the handle lever, through each rigid link and through to the spindles of the truck to effect turning of the wheels.

In a third embodiment of the invention, the steering mechanism is motorized and the handles rigidly mounted to the frame. In this embodiment, the hand truck is provided with an electric motor that is mounted to the frame. This motor is electrically connected to both a power source and to a control switch which is typically mounted to one of the handles. In one aspect of this embodiment, included in the motor is a drive cable which is driven by an internal drive gear. The drive cable is connected at a first end to a drive link which is in turn pivotally connected to one of the spindle levers so that movement of the drive cable effects similar motion of the spindle lever to thereby cause rotation or pivoting of the wheels. When the motor is activated to turn the drive gear in either direction, the inner drive cable is urged to the left or right of the motor depending upon the direction selected with the control switch. Limit switches are positioned adjacent a second end of the drive cable to limit the extent to which the wheels can be turned in either direction.

Thus, it is an object of this invention to provide a steerable hand truck that can be easily turned by the operator in areas in which space is limited.

Another object of this invention is to provide a steerable hand truck which reduces the likelihood of operator injury during use.

Other objects, features and advantages of this invention will become apparent upon reading the following specification, when taken in conjunction with the accompanying drawings.

DETAILED DESCRIPTION

Figure 1:
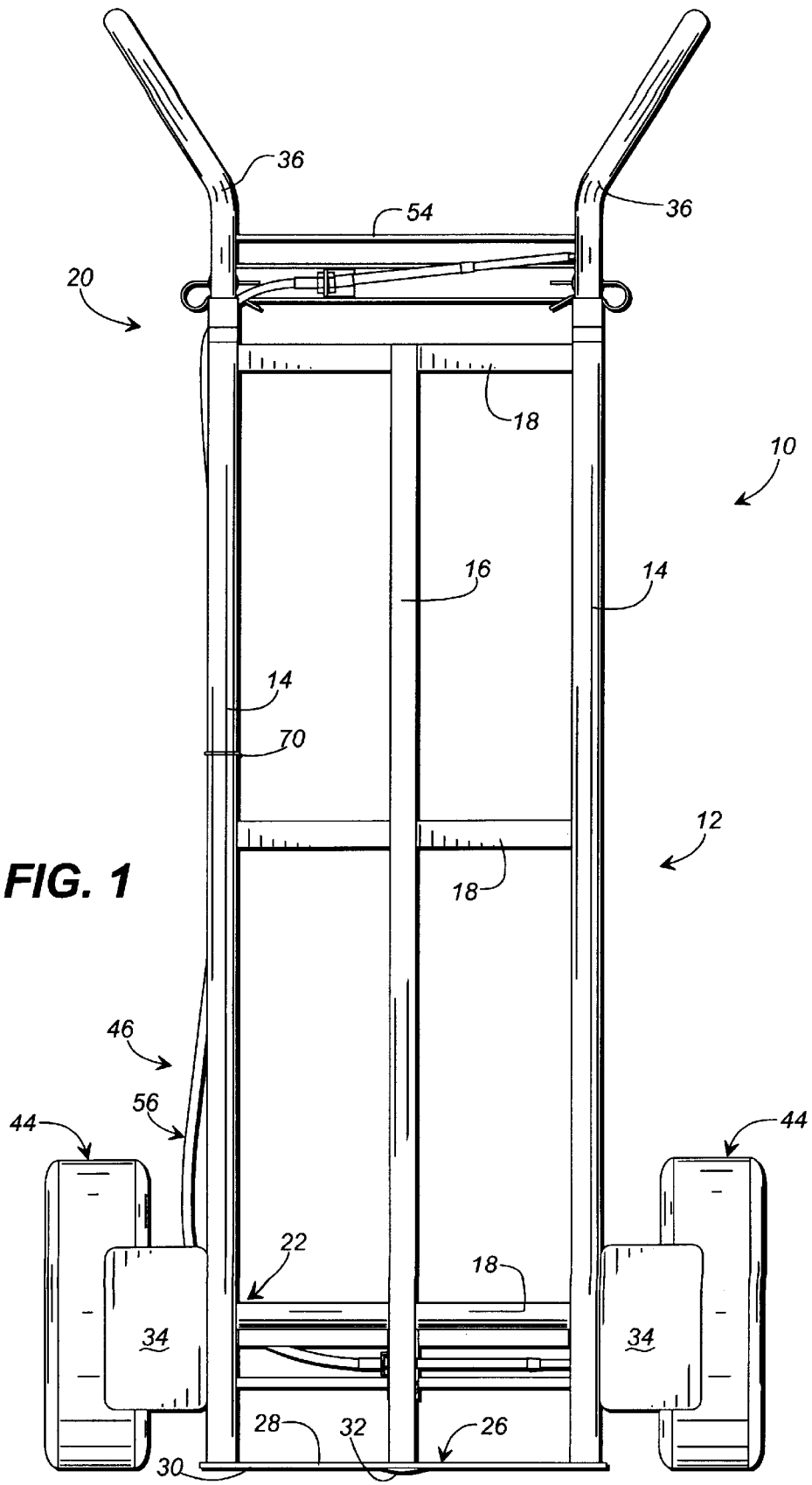
FIG. 1 is a front view of a first embodiment of the steerable hand truck of the present invention.

Turning to the figures in which like reference numerals correspond to like parts, FIGS. 1–5 illustrate a first embodiment of the steerable hand truck 10. As is conventional in the art, the hand truck 10 includes an elongated rigid frame 12. The frame comprises a pair of opposed parallel side rails 14, a vertical cross brace 16, and a plurality of horizontal cross braces 18. The side rails 14 are typically formed from hollow tubing or piping composed of a metal such as steel. The cross braces are typically formed from solid bars likewise composed of a metal such as steel. It will, however, be understood that other materials such as aluminum or wood could be used to fabricate these components, if desired. When composed of metal, each of the cross braces 16 and 18 are attached to by conventional means of attachment such as by welding or brazing.

As shown in FIG. 1, the frame 12 has an upper end 20 and a lower end 22. Formed on the rear side of the frame 12 at the lower end 22 is an axle support 24 (FIG. 3) which is used to support the axle of the hand truck to be described herein. Typically, this axle support 24 is formed from a single metal bar or tube, although other materials may be used. Extending forwardly from the lower end 22 of the frame directly opposite the axle support is a load platform 26 having a top surface 28 and a bottom surface 30. The platform is typically a metal plate of sufficient size and thickness to support loads that are commonly transported with hand trucks. Extending downwardly from the bottom surface 30 of the platform 26 is a pivot 32. The pivot 32 is typically formed in the rearward portion of the platform 26 adjacent the frame 12 and provides a pivot point about which the hand truck 10 may be spun through 0° to 360° to turn the truck in confined spaces. Although possible of taking the form of any extension about which the truck can pivot, the pivot 32 usually takes the form of a depression formed directly in the platform 26. Extending outwardly from each side rail 14 adjacent the platform 26 are guard plates 34. These guard plates are of similar construction to the platform and ensure that the load positioned on the platform does not interfere with the operation of the hand truck.

Figure 2:
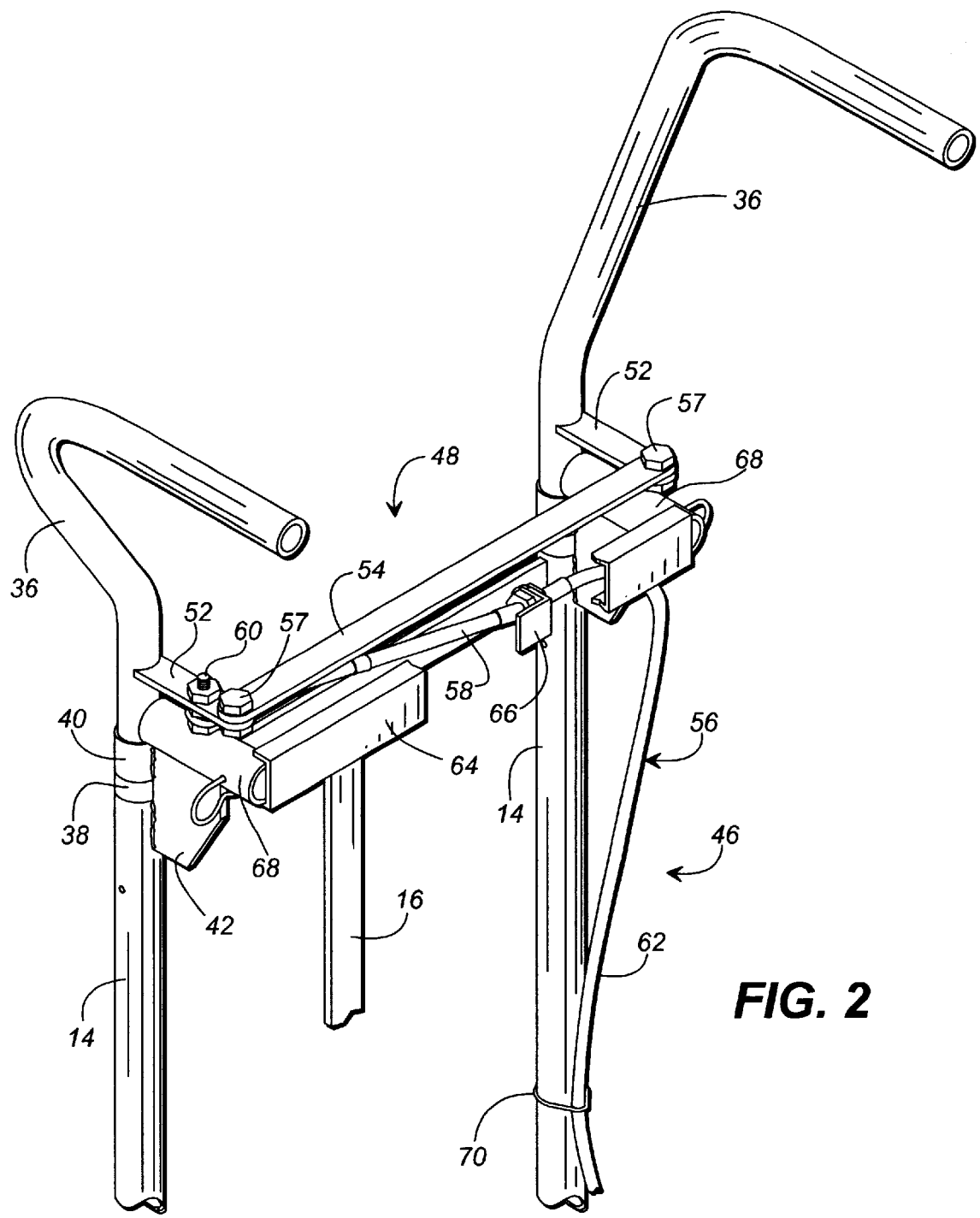
FIG. 2 is a partial perspective view of the hand truck of FIG. 1 which shows the upper steering mechanism.

Pivotally mounted to the upper end 20 of the frame 12 is a pair of handles 36, as shown most clearly in FIG. 2. One handle 36 is concentrically mounted within each of the side rails 14 such that each can rotate about the central axis of its respective rail. Typically, each of the handles is formed from metal tubing or piping having an outer diameter slightly smaller than the inner diameter of the side rails. Each handle 36 is maintained in a fixed vertical position with a pair of collars. A first collar 38 is welded to the handle and a second collar 40 is disposed about the handle above the first collar. Welded to both the second collar 40 and the side rail 14 on each side of the frame 12 is a connection plate 42 which rigidly connects the second collar and the side rail such that each second collar is fixed in position and each handle free to turn therein. Arranged in this manner, the first collar 38 will abut the top of the side rail 14 when the handles are pushed downwardly to prevent the handles 36 from being pushed further into the side rail. Similarly, this collar will abut the upper collar 40 when the handles are pulled upwardly to prevent the handles from being pulled out of the side rail.

Figure 3:
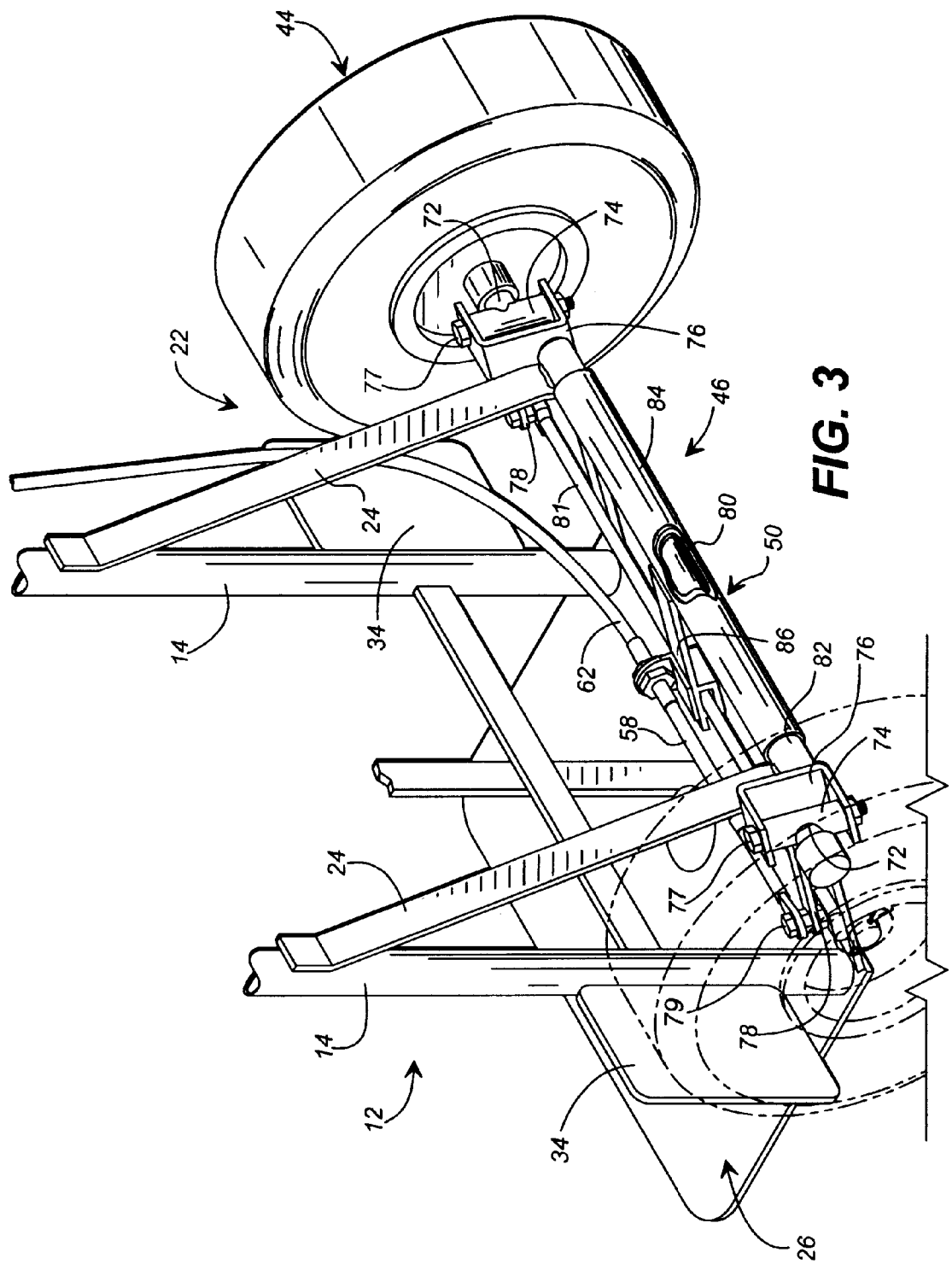
FIG. 3 is a partial perspective view of the hand truck of FIG. 1 which shows the lower steering mechanism.

As depicted in FIG. 3, placed on both sides of the lower end 22 of the frame are wheels 44 which are operatively connected to the axle support 24 of the frame 12. As mentioned above, unlike conventional hand trucks, the wheels 44 of the present invention are steerable. The steerability of the present hand truck is made possible by a steering mechanism 46 identified generally in FIGS. 1–3. In the first embodiment, this steering mechanism comprises two distinct portions, an upper steering mechanism 48 positioned adjacent the handles 36 and a lower steering mechanism 50 positioned adjacent the wheels 44. As shown in FIG. 2, the upper steering mechanism 48 generally comprises a handle lever 52 that extends rearwardly from each handle 36 and a steering tie rod 54 which is pivotally connected to each handle lever 52 with conventional fasteners 57 such as bolts, screws, or rivets. Arranged in this manner, the handle tie rod 54 maintains the handles in parallel relationship such that rotation or pivoting of one handle effects similar rotation or pivoting of the other. Typically, both the handle levers and the tie rods are constructed of solid metal bars, although it will be appreciated by persons skilled in the art that alternative construction is possible. Further pivotally connected to one of the handle levers 52 is a sheathed steering cable 56. The sheathed steering cable 56 comprises an inner cable 58 which is pivotally connected at a first end to the handle lever 52 with a conventional fastener 60 such as a bolt, screw, or rivet, and an outer sheath 62 which surrounds nearly the entirety of the inner cable 58. A first end of the outer sheath 62 is mounted to a mounting plate 64 with a mounting bracket 66. The mounting plate 64 is mounted to the frame with a pair of extension tubes 68 that extend rearwardly from the hand truck and which are themselves mounted to the aforementioned connection plates 42. Typically, the inner cable 58 is composed of a metal such as steel and the outer sheath 62 has a substantially rigid metallic core (not shown) which is surrounded by a polymeric cladding. Being connected to a distal portion of the handle lever 52, the inner cable 58 may be pulled out from or pushed into the outer sheath 60 through rotation of the handles 36.

The sheathed steering cable 56 extends downwardly along the elongated rigid frame 12 toward the lower steering mechanism 50 shown in FIG. 3. To ensure that the sheathed steering cable 56 does not interfere with the operator or other objects, the cable 56 is typically tied to the frame with a cable tie 70 (FIG. 1) or alternative conventional retainer. As illustrated in FIG. 3, each of the wheels 44 is rotatably mounted to a wheel axle 72 which extends outwardly from an axle spindle 74. The axle spindle 74 is pivotally mounted to a spindle bracket 76 with an elongated fastener 77 such as a bolt or pin. The spindle bracket 76 functions to operatively connect each wheel axle 72 to the frame 12. Extending forwardly from each axle spindle 74 is a spindle lever 78. Pivotally connected to each of the spindle levers 78 is a wheel tie rod 81 which is of similar construction as the handle tie rod. Like the handle tie rod, the wheel tie rod 81 maintains the wheels in parallel relationship such that pivoting of one wheel will effect similar movement of the other. A second end of the inner cable 58 of the sheathed steering cable 56 is likewise pivotally connected to one of spindle levers 78 with the conventional fastener described above. Typically, conventional fasteners 79 such as bolts, screws, or rivets are used to make this connection between the spindle levers and the tie rod.

Extending between each spindle bracket 76 is a central axle 80. The central axle extends concentrically within an inner axle sleeve 82 which is directly mounted to the axle support 24 of the frame 12. Each of the spindle brackets 76 is rigidly mounted to the central axle 80 in an off-center configuration, the purpose of which will be described below. The inner axle sleeve 82 is positioned concentrically within an outer axle sleeve 84 which is free to rotate thereabout. Extending forwardly from the outer axle sleeve 84 is a mounting bracket 86 to which a second end of the outer sheath 62 is mounted.

Figure 4:
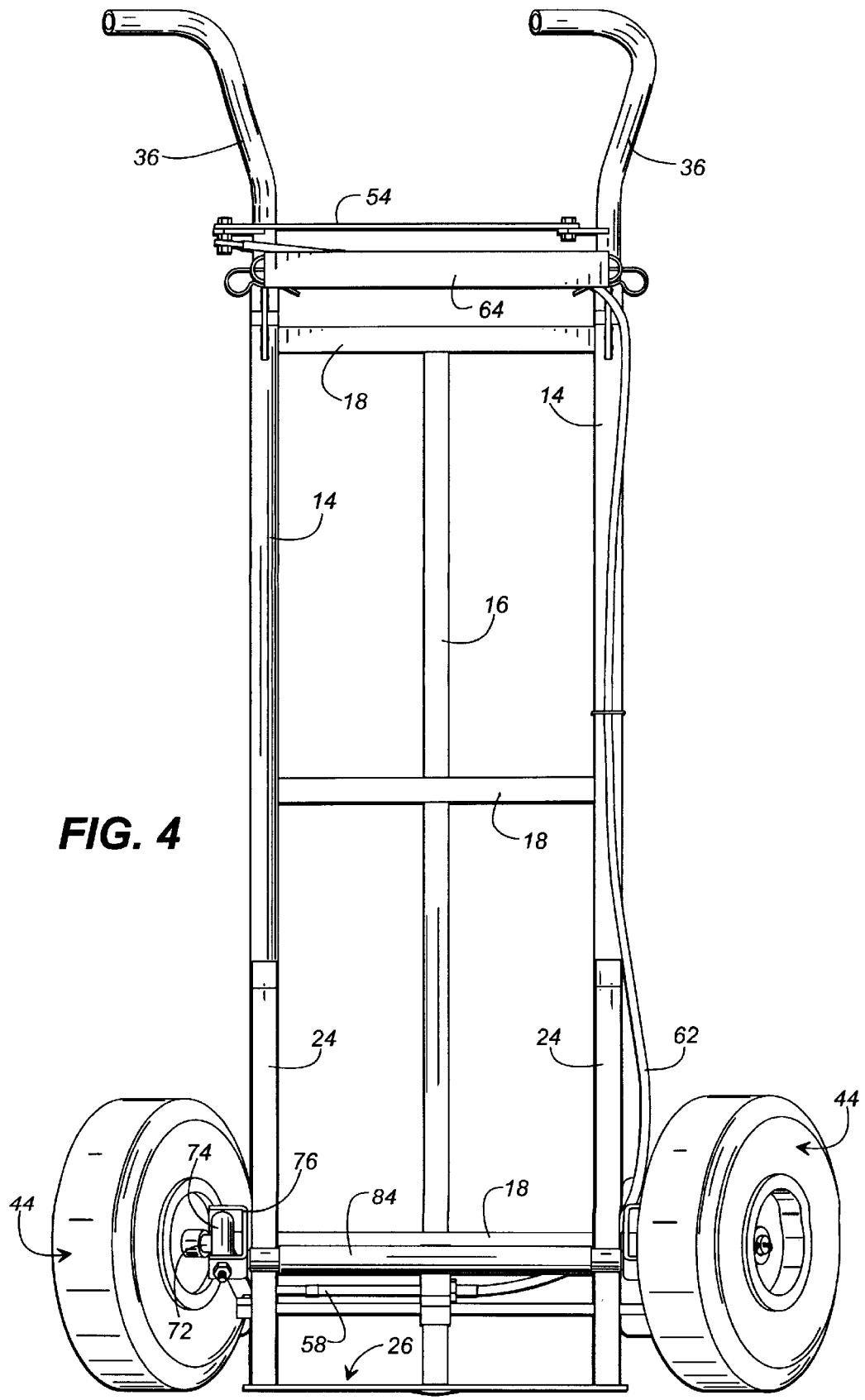
FIG. 4 is a rear view of the hand truck of FIG. 1 shown in a turned orientation.

In operation, the pivotable handles 36 of the first embodiment can be used to effect turning of the wheels 44 as shown in FIG. 4. To make such a turn, the operator simply turns the handles to either side. Being linked by the handle tie rod 54, the handles are maintained parallel to each other regardless of which direction they are turned. Turning the handles causes the inner cable 58 pivotally connected thereto to either be pushed further into or pulled further out of the outer sheath 62. For example, if the handles are turned to the left of the operator as shown in FIG. 4, the inner cable 58 is pulled a specified distance out of the sheath 62. As the inner cable is pulled out of the sheath at the upper end of the frame, the cable is similarly pulled into the sheath at the lower end of the frame within the lower steering mechanism 50. Having a rigid core, the outer sheath 62 generally maintains its original orientation against the force of the inner cable 58. The pulling action of the inner cable 58 and the rigidity of the outer sheath 62 cause the spindle lever 78 to which the inner cable 58 is connected to be pulled to the right of the operator, thereby turning the wheel 44 connected to the spindle 74 to the right. Being linked to this spindle lever with the wheel tie rod 81, the opposite spindle lever is likewise pivoted, causing the opposite wheel 44 to also turn to the right an equal amount.

The arrangement of the central axle 80, the inner axle sleeve 82, and the spindle brackets 76 ensures accurate steering control regardless of the orientation of the frame. Steering can be made difficult when moving heavy loads with the frame tilted to a large degree. When the orientation of the spindles is fixed with regard to the frame, this tilting of the frame alters the position of the spindles so that they are not upright. Turning with the spindles in this non-upright orientation can place undue stresses on the components of the lower steering mechanism that could interfere with steering or damage the mechanism. This problem is obviated by permitting the lower steering mechanism 50 to pivot or float. Since the spindle brackets are mounted to the central axis in an off-center manner and since the central axis is free to rotate within the inner axle sleeve, the spindle brackets, and therefore the spindles, are self-righting such that they are automatically maintained in an upright orientation irrespective of the orientation of the truck frame 12. Therefore, accurate and controlled steering is possible under all conditions.

To avoid interference with the operation of the steering cable 56, the steering cable is likewise mounted in a pivoting or floating manner. As described above, the outer sheath 62 of the steering cable 56 is mounted to a mounting bracket 86 which is mounted to the outer axle sleeve 84. Since the outer axle sleeve 84 is free to rotate about the inner axle sleeve 82, the steering cable 56 is free to rotate along with the spindle levers as the hand truck is tilted to various angles.

So described, the hand truck of the present invention greatly simplifies the hauling process. Being steerable, the hand truck is particularly useful in picking up and hauling objects where space is limited. For example, when an object to be moved is positioned against a wall and can only be approached alongside the wall, the object can be moved directly away from the wall by simply turning the handles and moving the object forward or backward as opposed to slowly moving the object away from the wall at a very shallow angle. The possibility of operator injury is also minimized during turning in that the operator need not swing the truck from side to side to effect these turns. Moreover, interference with the operator's stride during hauling is minimized due to the compact configuration of the lower steering mechanism.

Figure 5:
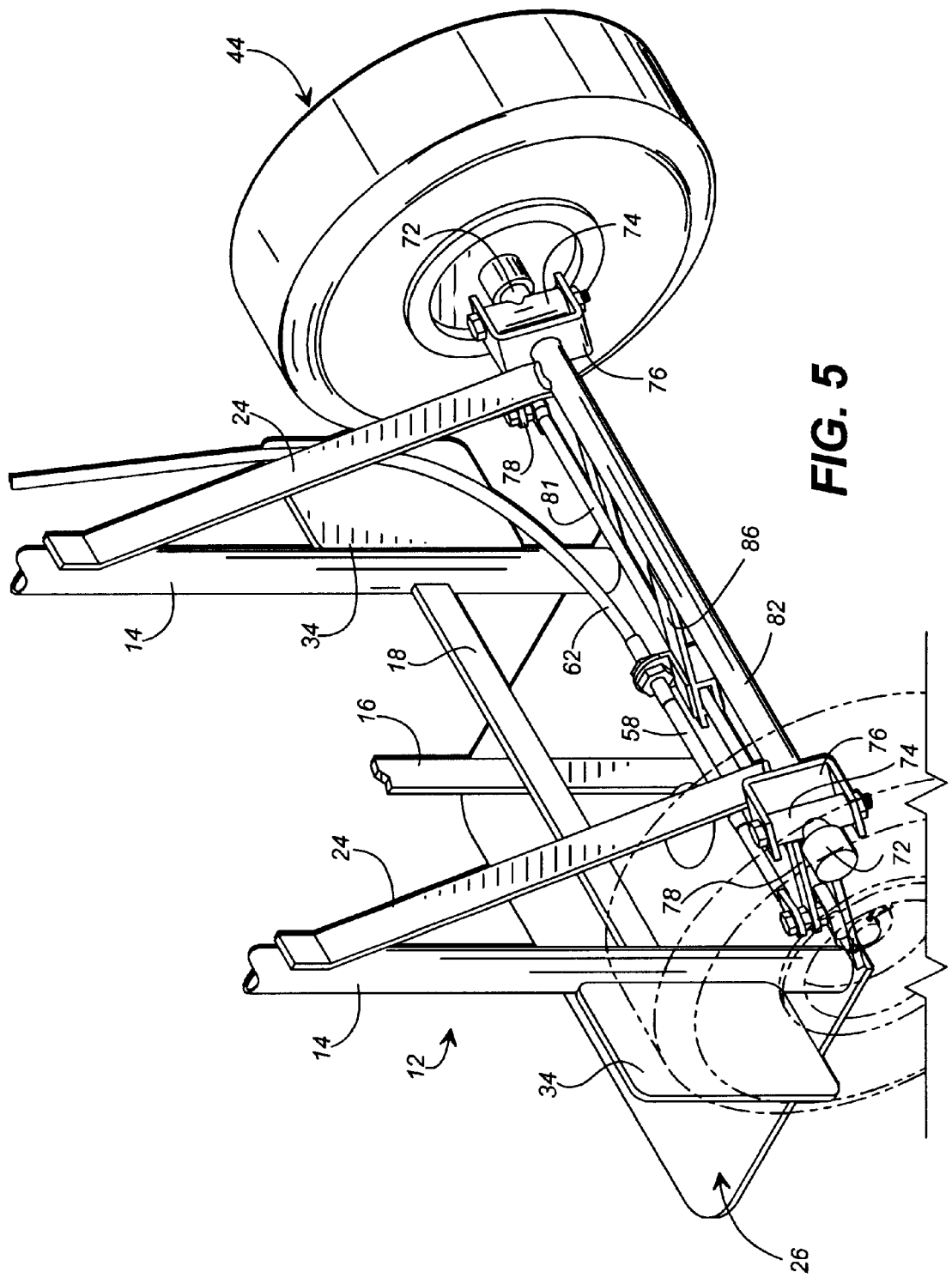
FIG. 5 is a partial perspective view of the hand truck of FIG. 1 which shows modified version of the lower steering mechanism.

FIG. 5 illustrates a possible modification of the first embodiment. According to this modification, the pivoting or floating aspect of the steering mechanism is removed with the central axle 82 being directly mounted to the axle support 24 of the frame 12 and the spindle brackets 76 centrally mounted to the central axle at an angle of approximately 45 degrees with respect to the frame 12. Similarly, the steering cable mounting bracket is directly mounted to the central axle such that its orientation is fixed with respect to the frame 12. With this arrangement, the complexity, weight, and cost of manufacturing of the steerable hand truck are reduced. Despite removing the pivoting or floating aspect of the steering mechanism, adequate steering control is maintained under most hauling conditions due to the fixed angular orientation of the spindles.

Figure 6:
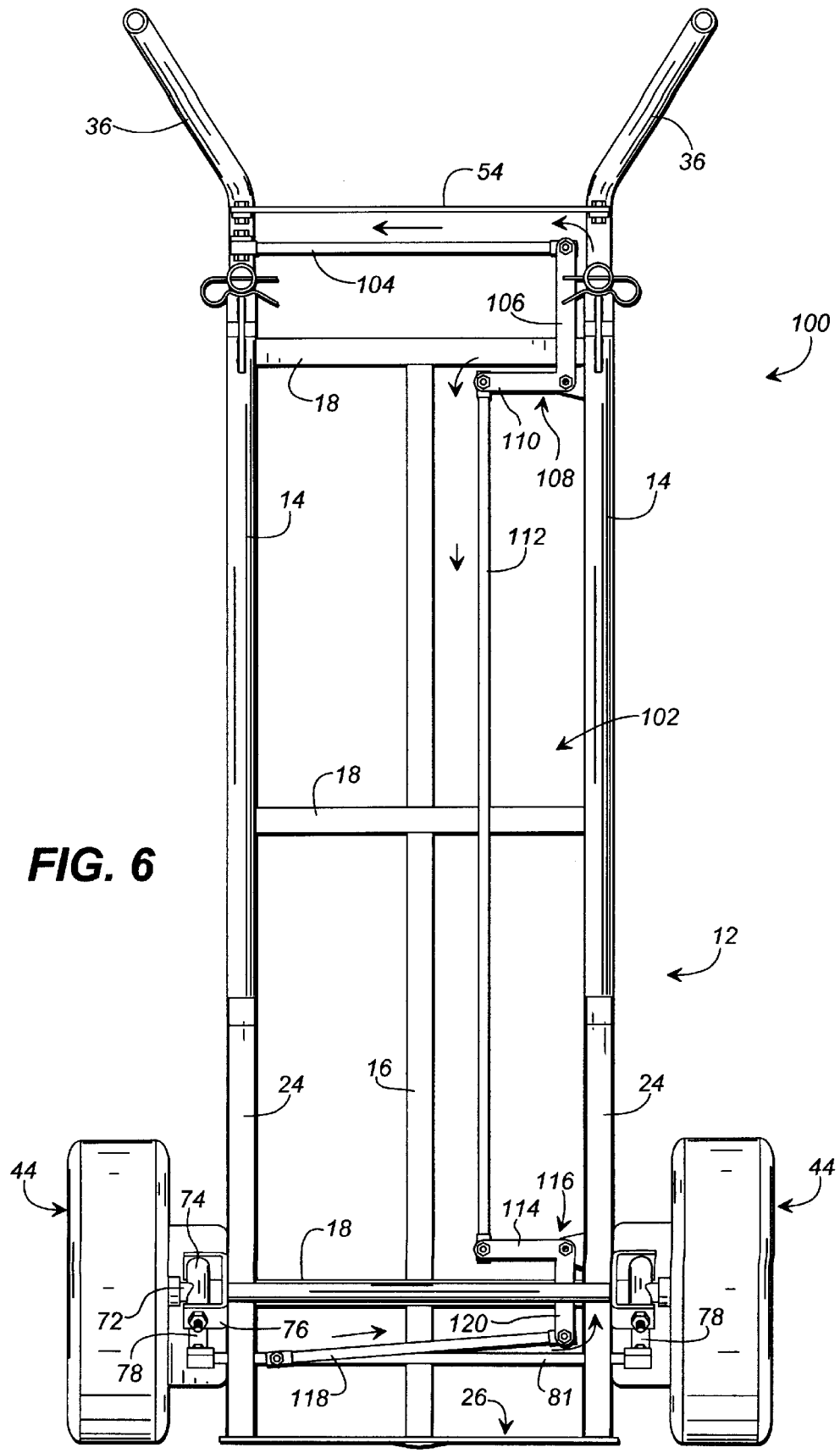
FIG. 6 is a front view of a second embodiment of the steerable hand truck of the present invention.

FIG. 6 illustrates a second embodiment of the steerable hand truck 100. This hand truck is identical in structure to the hand truck of the first embodiment except for the steering mechanism 102. Accordingly, description of the second embodiment is limited to this steering mechanism. It will be understood that all pivotal connections described in relation to this second embodiment are made with conventional fasteners of the type described above in relation to the first embodiment.

As shown in the FIG. 6, the steering cable of the first embodiment is removed and is replaced with a series of rigid links. A first end of a rigid handle link 104 is pivotally connected to one of the handle levers 52. A second end of this handle link is pivotally connected to a first arm 106 of a first angle link 108 which is itself pivotally mounted to the truck frame 12. Pivotally connected to a second arm 110 of the first angle link 108 is a first end of an elongated rigid transmission link 112. The other end of the transmission link 112 is pivotally connected to a first arm 114 of a second angle link 116 which is itself pivotally mounted to the frame 12. A rigid wheel link 118 is pivotally connected at a first end to a second arm 120 of the second angle link 116, and is pivotally connected at its other end to the wheel tie rod 81 which operatively connects the two wheels 44. Due to the rigidity of the steering mechanism of the second embodiment, the fixed axle configuration described above in relation to the modified first embodiment is used with the hand truck 100 of the second embodiment as is apparent from FIG. 6.

In use, the steerable hand truck of the second embodiment functions similarly to that of the first. To make a turn, the operator simply turns the handles of the truck. The movement of the handle lever connected to the handle link 104 causes the handle link to be displaced to either side. This movement of the handle link 104 is then translated to the wheel tie rod 81 via the first angle link 108, the transmission link 112, the second angle link 116, and the wheel link 118, as indicated by directional arrows shown in FIG. 6, such that pivoting of the handles 36 effects equal pivoting of the wheels 44.

Figure 7:
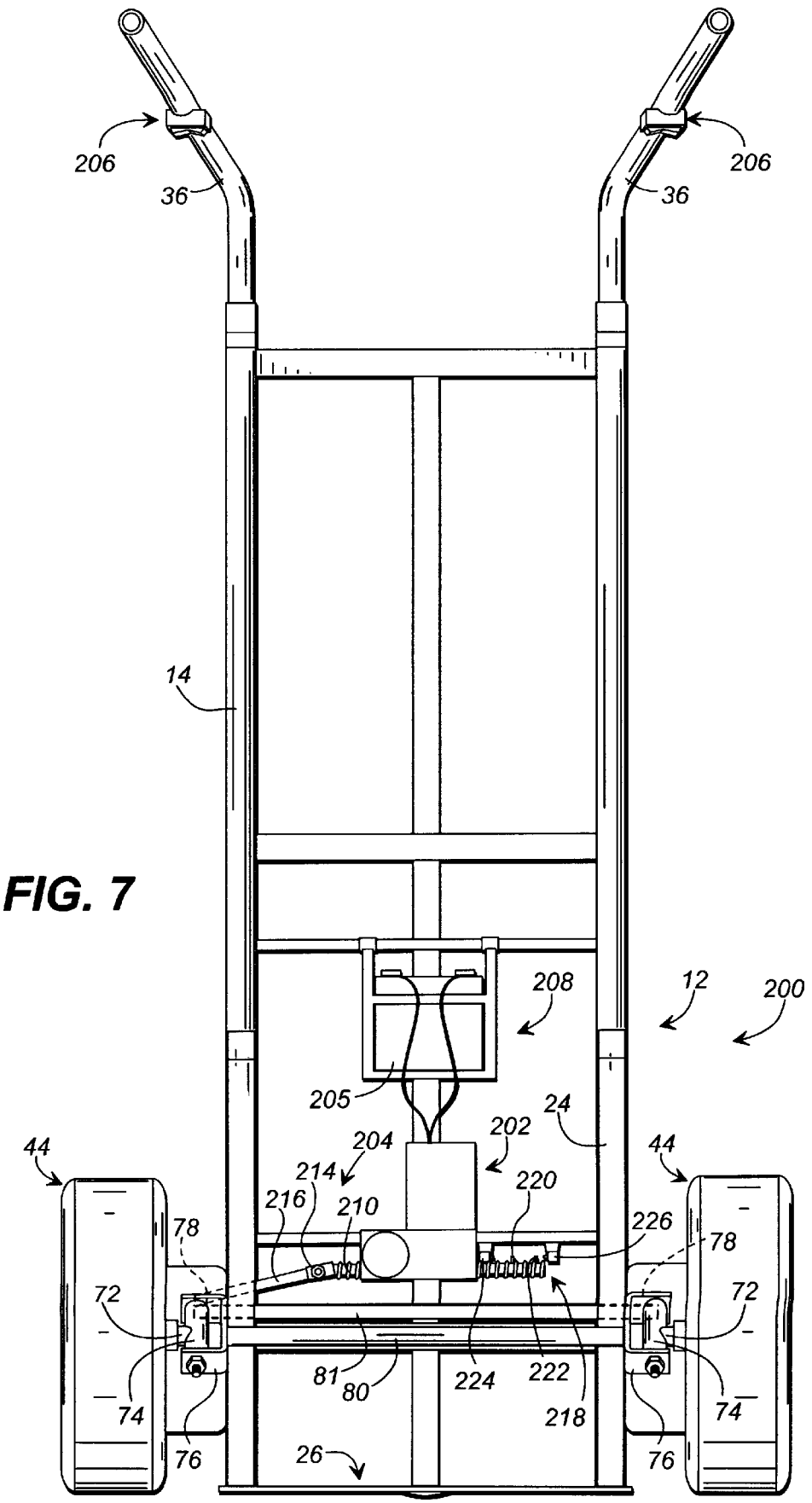
FIG. 7 is a front view of a third embodiment of the steerable hand truck of the present invention.

In a third embodiment of the invention, the steerable hand truck is motorized. FIG. 7 illustrates the motorized steerable hand truck 200. The hand truck of the third embodiment is identical in construction to the second embodiment except for the steering mechanism, and therefore the discussion is limited to this steering mechanism. As shown in FIG. 7, the hand truck 200 is provided with an electric motor 202 which is mounted to the frame adjacent the lower steering mechanism 204. This motor 202 is electrically connected to both a power source 205 such as a 12 volt battery and a control switch 206 which typically comprises a rocker switch mounted to one of the handles 36. The power source 205 is supported by a power source cradle 208 which is pivotally mounted to the truck frame 12 so that the power source is maintained in an upright position regardless of the angle of orientation of the frame.

In one aspect of the motor, the motor includes a drive cable 210 which is engaged by an internal drive gear (not shown). In such a configuration, the drive cable comprises an inner drive cable (not shown) that is surrounded by a helically spiraled outer wire 212. The outer wire 212 is helically coiled about the inner drive cable such that spaces are formed between each coil of the outer wire with which the teeth of drive gear can engage. When the motor is activated to turn the drive gear in either direction, the spiraled outer wire 212, and therefore the inner drive cable, is urged to the left or right of the motor depending upon the direction selected with the control switch 206.

The drive cable 210 is connected at a first end 214 to a drive link 216 which is in turn pivotally connected to one of the spindle levers 78 so that movement of the drive cable effects similar motion of the spindle lever to thereby cause rotation or pivoting of the wheel 44 which is rotatably mounted to the particular axle spindle 74. Typically, a second end 218 of the drive cable extends from the opposite side of the motor 202. Attached to the drive cable adjacent this second end 218 are a pair of limit extensions 220 and 222. Mounted to the frame outside of each of the limit extensions are a pair of limit switches 224 and 226 that are electrically connected to the motor 202. Situated in this manner, the limit extensions come in contact with the limit switches when the drive cable is moved to the point at which the maximum turn angle is reached by the wheels in either direction. Upon contact between either limit extension and its adjacent limit switch, further turning in that same direction is inhibited by the halting of further actuation of the motor in that direction. For example, if the control switch is used to turn the wheels to the left, the limit extension 220 will contact limit switch 224, preventing further turning of the wheels to the left. At this point, with the limit extension 220 in contact with the limit switch 224, the motor can only be actuated to turn the wheels to the right until such contact is broken. Although the motor and steering mechanism have been described in specific terms, it will be appreciated that alternative configurations can be used. For example, the motor and steering mechanism could alternatively take the form of a motorized rack and pinion mechanism.

While preferred embodiments of the invention have been disclosed in detail in the foregoing description and drawings, it will be understood by those skilled in the art that variations and modifications thereof can be made without departing from the spirit and scope of the invention as set forth in the following claims.

I claim:

1. A steerable hand truck, comprising:
    an elongated rigid frame having an upper end, a lower end, and a pair of opposed sides;
    a load platform extending forwardly from the lower end of said elongated rigid frame for supporting loads to be transported;
    a pair of handles pivotally connected to the upper end of said elongated rigid frame;

a pair of wheel axles pivotally connected to the lower end of said elongated rigid frame, one wheel axle being positioned on each side of said frame;

a pair of wheels, one wheel being rotatably mounted on each of said wheel axles; and a steering mechanism including a sheathed steering cable that is operatively connected to each of said pivotable handles and each of said wheel axles, wherein said steering cable transmits pivotal movement of said handles to said wheel axles such that pivotal articulation of said handles effects turning of said wheel axles and said wheels attached thereto, a pair of spindle brackets operatively mounted to the lower end of said elongated rigid frame, one spindle bracket being positioned on each side of said frame, a pair of axle spindles, one axle spindle being pivotally mounted to each of said spindle brackets, said wheel axles being mounted to said axle spindles such that one wheel axle extends outwardly from each axle spindle, and an inner axle sleeve directly mounted to said elongated rigid frame and a central axle concentrically positioned within said inner axle sleeve and free to rotate therein, said central axle having opposed ends extending from said inner axle sleeve, one spindle bracket being rigidly mounted to each of said opposed ends of said central axle such that said spindle brackets are maintained in parallel relationship.

2. The steerable hand truck of claim 1, wherein said steering mechanism further includes a wheel tie rod operatively connected to each of said wheel axes, said wheel tie rod maintaining said wheels in parallel relationship.

3. The steerable hand truck of claim 1, wherein said steering mechanism further includes a handle tie rod pivotally connected to each of said handles, said handle tie rod maintaining said handles in parallel relationship.

4. The steerable hand truck of claim 1, wherein said spindle brackets are directly mounted to said elongated rigid frame.

5. The steerable hand truck of claim 1, wherein each spindle bracket is mounted off-center to said central axle such that said spindle brackets automatically assume a substantially upright orientation regardless of the angular orientation of said elongated rigid frame so that effective steering control can be maintained without regard to the tilt angle of said hand truck.

6. The steerable hand truck of claim 1, wherein said steering mechanism further includes an outer axle sleeve which concentrically surrounds said inner axle sleeve, and a lower steering cable mounting bracket mounted to said outer axle sleeve, said outer axle sleeve being free to rotate about said inner axle sleeve such that said outer axle sleeve and said lower steering cable mounting bracket can rotate about said inner axle sleeve during hand truck operation.

7. The steerable hand truck of claim 1, wherein said load platform has a top surface and a bottom surface, and wherein said bottom surface is provided with a pivot that extends downwardly therefrom, said pivot permitting said hand truck to be spun about said pivot when said hand truck is upright.

8. A steerable hand truck, comprising:

an elongated rigid frame having an upper end, a lower end, and a pair of opposed sides;

a load platform extending forwardly from the lower end of said elongated rigid frame for supporting loads to be transported;

a pair of handles pivotally connected to the upper end of said elongated rigid frame;

a pair of wheel axles pivotally connected to the lower end of said elongated rigid frame, one wheel axle being positioned on each side of said frame;

a pair of wheels, one wheel being rotatably mounted on each of said wheel axles; and a steering mechanism including a plurality of rigid links operably connected to each of said handles and each of said wheel axles, wherein said rigid links transmit pivotal movement of said handles to said wheel axles such that pivotal articulation of said handles effects turning of said wheel axles and said wheels attached thereto, a rigid handle link pivotally connected to one of said handles, an elongated rigid transmission link operatively connected to said rigid handle link, and a rigid wheel link operatively connected to said rigid transmission link and both of said wheel axles, wherein movement of said handles effect movement of said handle link which is transmitted through said transmission link to said wheel link to effect pivotal movement of said wheel axles and therefore said wheels, and first and second angle links pivotally mounted to said elongated rigid frame, said first angle link pivotally connecting said handle link to said transmission link and said second angle link pivotally connecting said transmission link to said wheel link.

9. The steerable hand truck of claim 8, wherein said steering mechanism further includes a wheel tie rod operatively connected to each of said wheel axles, said wheel tie rod maintaining said wheels in parallel relationship.

10. The steerable hand truck of claim 8, wherein said steering mechanism further includes a handle tie rod pivotally connected to each of said handles, said handle tie rod maintaining said handles in parallel relationship.

11. The steerable hand truck of claim 8, wherein said steering mechanism further includes a pair of spindle brackets directly mounted to the lower end of said elongated rigid frame, one spindle bracket being positioned on each side of said frame, and a pair of axle spindles, one axle spindle being pivotally mounted to each of said spindle brackets, said wheel axles being mounted to said axle spindles such that one wheel axle extends outwardly from each of axle spindle.

12. The steerable hand truck of claim 8, wherein said load platform has a top surface and a bottom surface, and wherein said bottom surface is provided with a pivot that extends downwardly therefrom, said pivot permitting said hand truck to be spun about said pivot when said hand truck is upright.

* * * * *